(12) United States Patent
Toth

(10) Patent No.: US 6,260,629 B1
(45) Date of Patent: Jul. 17, 2001

(54) SWING HITCH

(76) Inventor: Delmar Toth, P.O. Box 3316, Humboldt, Saskatchewan (CA), S0K 2A0

( * ) Notice: Subject to any disclaimer, the term of this patent is extended or adjusted under 35 U.S.C. 154(b) by 0 days.

(21) Appl. No.: 09/356,367

(22) Filed: Jul. 19, 1999

(51) Int. Cl.[7] ................................................ A01B 73/00
(52) U.S. Cl. ......................... 172/282; 172/278; 172/310
(58) Field of Search .............................. 172/82, 83, 278, 172/280, 282, 310, 312, 507, 284, 285, 286, 291, 311; 280/426, 442, 443, 444, 445, 656

(56) References Cited

U.S. PATENT DOCUMENTS

| Re. 31,066 | * | 10/1982 | Whittaker | 172/282 |
|---|---|---|---|---|
| 2,684,618 | * | 7/1954 | Kelman et al. | 172/282 |
| 3,516,500 | * | 6/1970 | Butler | 172/282 |
| 3,751,891 | * | 8/1973 | Molzahn et al. | 56/228 |
| 4,040,490 | * | 8/1977 | Anderson | 171/63 |
| 4,206,812 | * | 6/1980 | Viel | 171/63 |
| 4,223,741 | | 9/1980 | Blumhardt . | |
| 4,346,909 | | 8/1982 | Hundeby . | |
| 4,360,215 | | 11/1982 | Nohl et al. . | |
| 4,442,662 | | 4/1984 | Jennings . | |
| 4,460,193 | * | 7/1984 | Dietz et al. | 280/444 |
| 4,555,897 | | 12/1985 | Degelman . | |
| 4,558,560 | | 12/1985 | Koch . | |
| 4,573,309 | | 3/1986 | Patterson . | |
| 4,585,076 | | 4/1986 | Stevens et al. . | |
| 4,641,491 | | 2/1987 | Van der Lely et al. . | |
| 4,662,161 | | 5/1987 | Patterson . | |
| 4,683,462 | | 7/1987 | Johnson, Sr. . | |
| 4,765,639 | | 8/1988 | Murray . | |
| 4,871,028 | | 10/1989 | Murray . | |
| 4,934,131 | * | 6/1990 | Frist et al. | 56/192 |
| 5,092,111 | | 3/1992 | Gleeson . | |
| 6,158,759 | * | 12/2000 | Perry | 280/444 |

* cited by examiner

*Primary Examiner*—Thomas B. Will
*Assistant Examiner*—Nathan Mammen

(57) ABSTRACT

An agricultural implement has a working position extending laterally behind a towing tractor and a transport position in which it is towed endwise behind the tractor. The implement has ground wheels that support the implement in both working and transport positions. These are rotatably mounted on the implement frame and are coupled to the hitch pole and the instrument by a steering linkage so that as the hitch pole moves between its working and transport positions, the wheels are steered between their respective working and transport positions.

12 Claims, 3 Drawing Sheets

SWING HITCH

FIELD OF THE INVENTION

The present invention relates to a swing hitch for an agricultural implement.

BACKGROUND

Various agricultural implements have elongate frames that extend laterally across the direction of travel when working. For transport these frames are often supported on wheels and towed endwise. A number of systems have been devised to permit the conversion between working and transport modes. Some of these use swing hitches, that is a tongue or hitch pole that will pivot between a working position extending from the front of the implement and a transport position extending from one end of the implement. In addition, various ground wheel mechanisms are used to support the implement in the two modes. Frequently this involves the use of two sets of wheels, one for transport and the other for working. In another arrangement, disclosed in Degelman U.S. Pat. No. 4,555,897, the wheels are mounted on swing arms and each is moved manually between its working and transport positions.

The present invention is concerned with a novel swing hitch system that simplifies the conversion from working to transport mode and vice versa.

SUMMARY

According to the present invention there is provided an agricultural implement having a working travel direction and a transport travel direction transverse to the working travel direction, said implement comprising:

a frame having a lateral extent in the transport travel direction;

first and second laterally spaced apart ground wheels, each mounted on the frame for rotation about a respective upright axis between a working position oriented in the working direction of travel and a transport position oriented in the transport travel direction;

a hitch pole mounted on the frame for pivotal movement between a laterally extending transport position and a working position transverse to the transport position; and a steering linkage connecting the hitch pole to the ground wheels for moving the ground wheels between their transport and working positions in response to movement of the hitch pole between the transport and working positions respectively.

Thus, moving the hitch pole between its working and transport positions produces a corresponding movement of the wheels used for ground support in the working position to a transport position. This eliminates the need for a second set of wheels for this purpose. It also eliminates the need for manual movement of the wheels as they are turned automatically with movement of the hitch pole.

Where additional support is required for the transport position, as where the first and second wheels are both mounted on either the leading or trailing side of the frame, one or more additional ground wheels may be provided on the unsupported side of the frame and lowered into a ground supporting transport position when required.

In an exemplary embodiment, the frame includes a laterally extending beam at the trailing side of the frame on which the first and second ground wheels are mounted. The hitch pole may also be mounted on this beam. The steering linkage includes steering arms on the wheels and drag links connecting to the steering arms to the hitch pole.

The present invention has applicability to a wide range of agricultural implements. One particular example, which will be described in more detail in the following, is a rock windrower.

BRIEF DESCRIPTION OF THE DRAWINGS

In the accompanying drawings, which illustrate an exemplary embodiment of the present invention.

DETAILED DESCRIPTION

Figure 1:
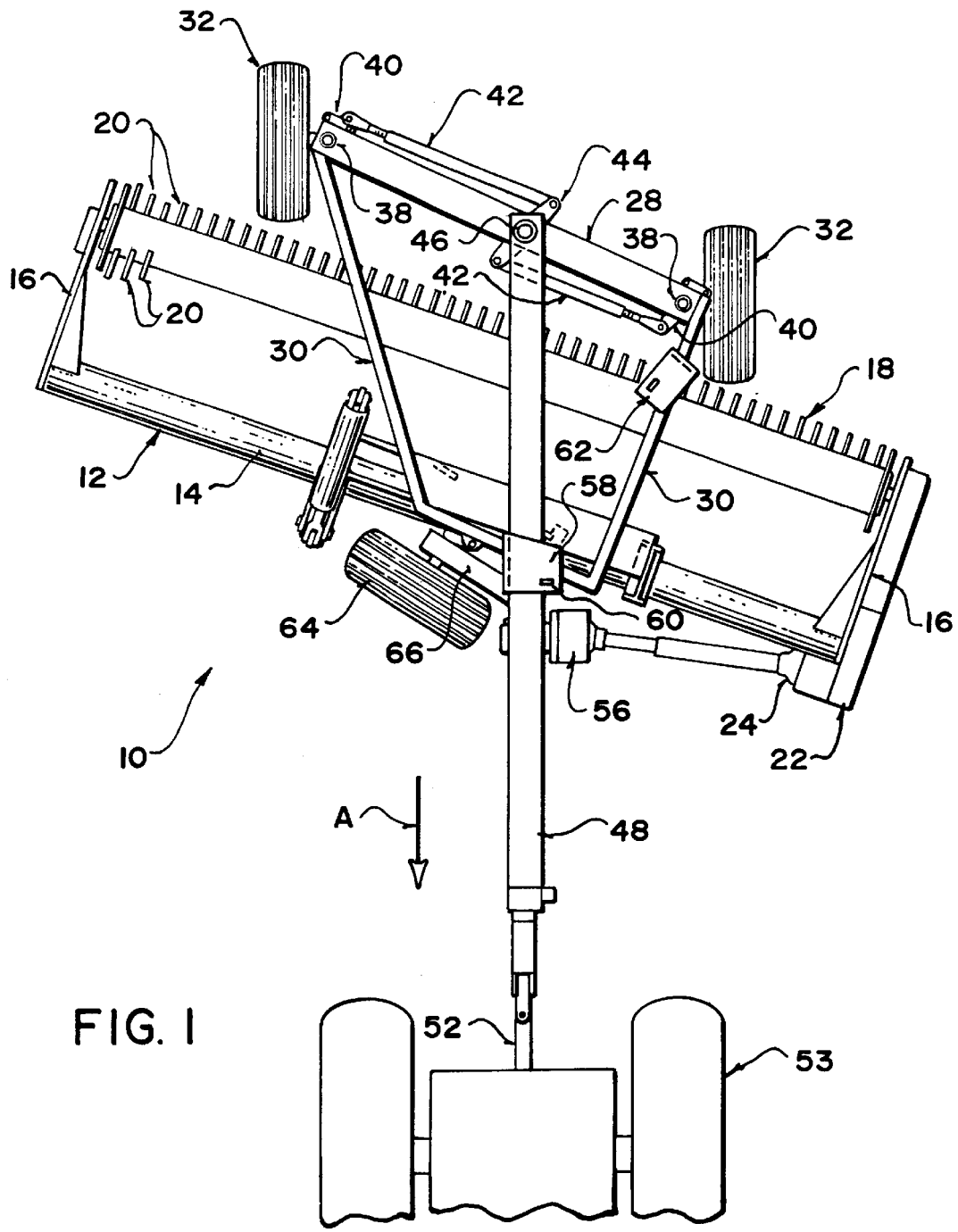
FIG. 1 is a plan view of a rock windrower according to the present invention in the working position.

Referring to the accompanying drawings, there is illustrated an agricultural implement, specifically a rock windrower 10 that is used for forming windrows of rocks on the surface of an agricultural field. The windrower has a frame 12 that includes a front cross member 14 carrying two trailing arms 16 at its opposite ends. The trailing arms carry a lateral rotor 18 carrying a helical array of blades 20 for displacing rocks along the rotor as the rotor is rotated and the windrower is advanced in the working travel direction illustrated by the arrow A in FIG. 1.

The rotor 18 is rotated by a rotor drive housed within a drive casing 22 carried by one of the trailing arms 16. This is coupled through a universal joint to a drive shaft 24 which is driven from a tractor power take off as will be discussed more fully in the following.

Figure 3:
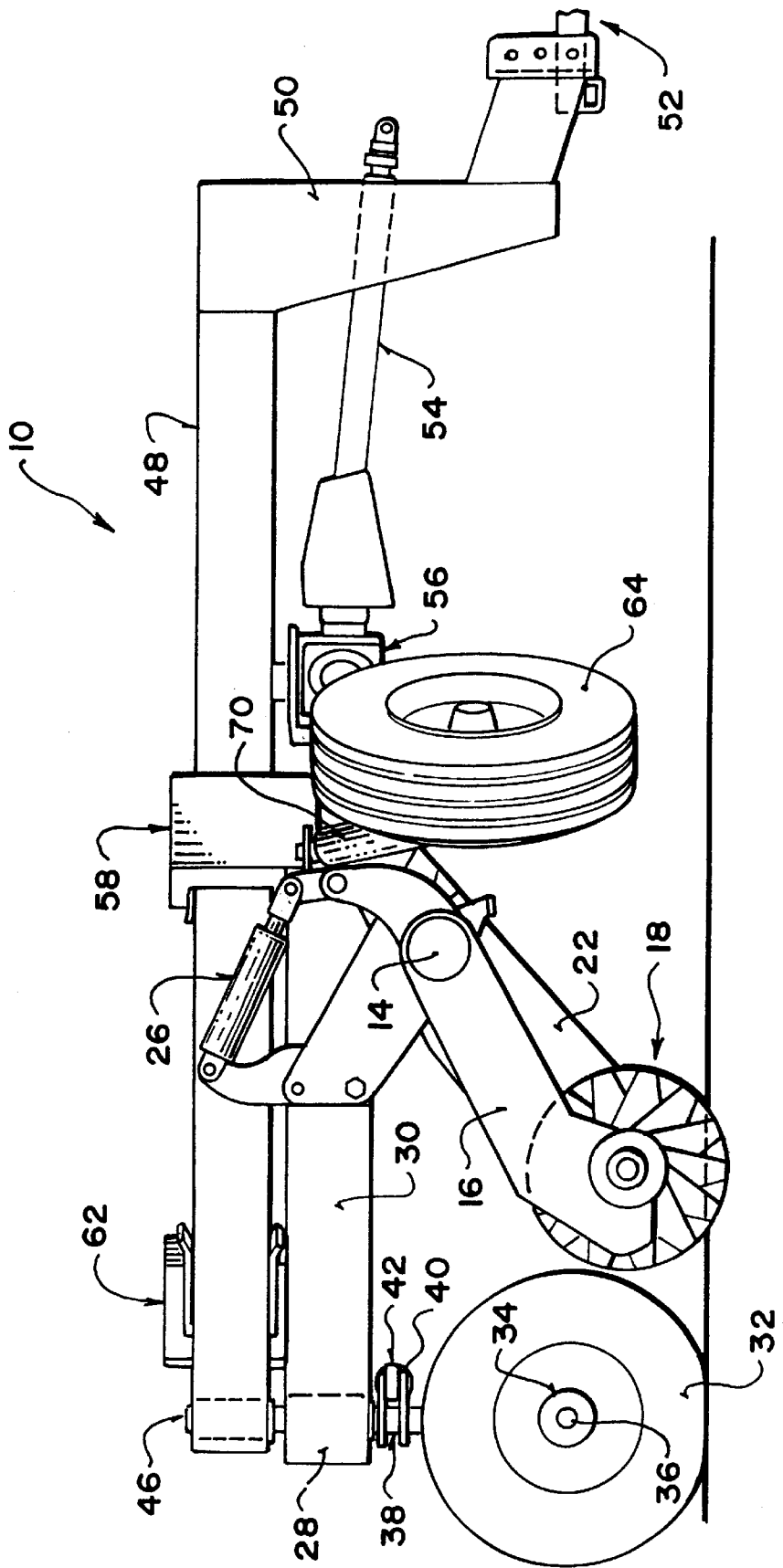
FIG. 3 is an end elevation of the windrower in the working position.

As illustrated most particularly in FIG. 3, the height of the rotor with respect to the frame 12 is controlled using a depth control cylinder 26 which rotates the trailing arms 16 on the front cross member 14.

The frame 12 includes a laterally extending rear beam 28 mounted on the front cross member by a pair of beams 30 projecting to the trailing side of the frame. Two ground support wheels 32 are carried by the rear beam. Each wheel has a hub 34 mounted on an axle 36 carried by a king pin 38. The king pin is mounted on the rear beam by appropriate bearings so that it will rotate about an upright axis.

Each king pin carries a steering arm 40. The steering arm is connected by a drag link 42 to a steering arm 44 mounted on an upright shaft 46, also carried by the rear beam 28. The shaft is fixed to a hitch pole 48 that extends forwardly from the rear beam 28, over the frame 12 to a downwardly offset end 50 which is configured to couple to a drawbar 52 on a tractor 53. The hitch pole carries a power take off shaft 54 that couples to the power take off of the tractor at the front and to a right angle gear box 56 at the rear. The gear box is also mounted under the hitch pole and has an output that connects directly to the drive shaft 24 for the rotor 18.

In the working position illustrated in FIG. 1, the hitch pole extends forwardly across the frame 12 and is seated in a cradle 58 mounted on the frame. The hitch pole is held in place using a wedge pin 60 through the cradle. In this position, the ground wheels 32 and the hitch pole are all generally parallel so that the windrower will follow the tractor with the frame 12 extending laterally, that is across the direction of travel.

Figure 2:
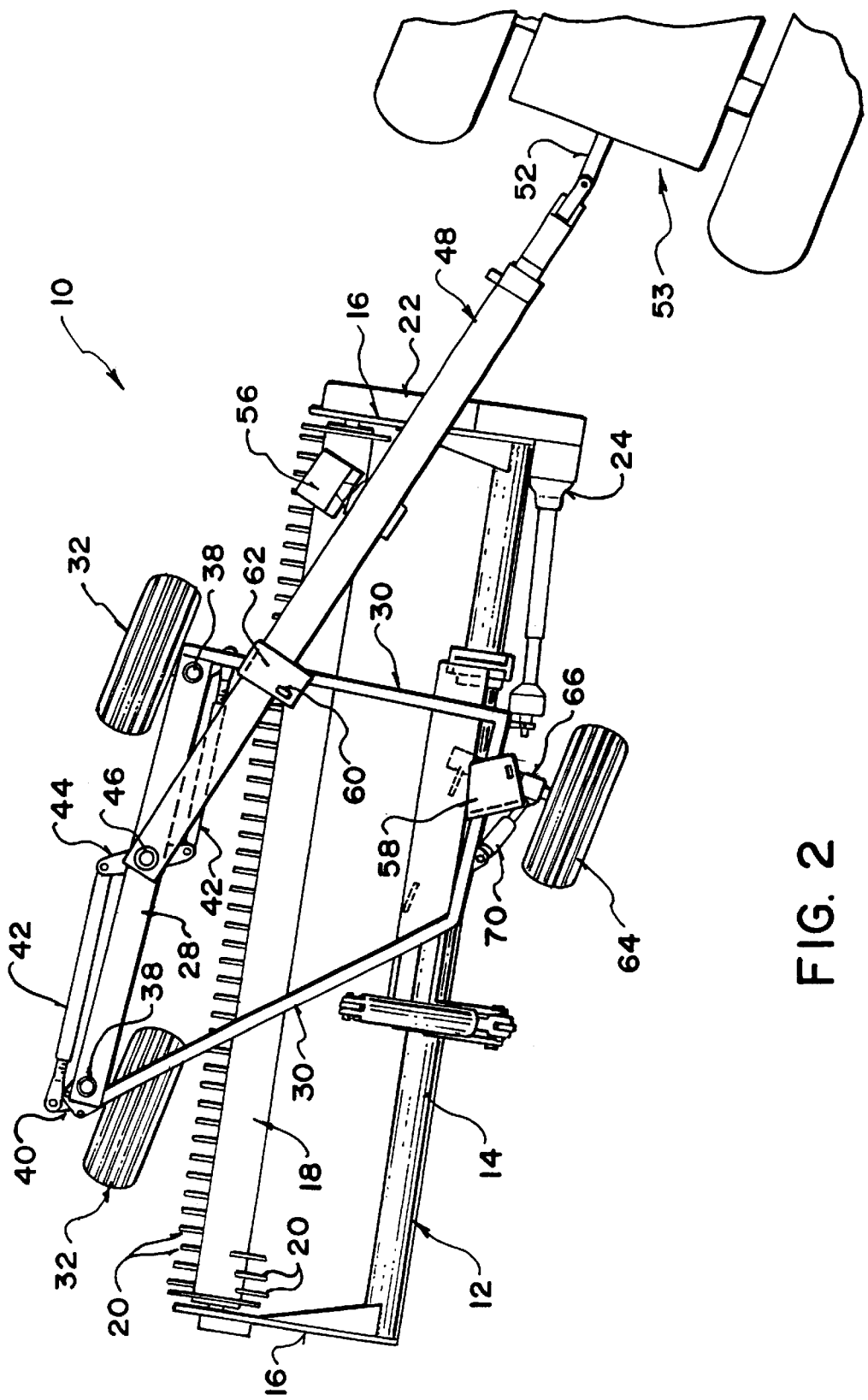
FIG. 2 is a plan view like FIG. 1, showing the windrower in the transport position.

When the windrower is moved to the transport position illustrated in FIG. 2, the drive shaft 24 is disconnected from the gear box 56 and is supported in place on the frame by an appropriate bracket (not shown). The wedge pin 60 is then removed and the hitch pole is swung to the position illustrated in FIG. 2. This rotates the steering arm 44 and, through the drag links 42 and the steering arms 40, the wheels 32. In this condition, the wheels are generally parallel and extend laterally of the windrower. To retain the hitch pole in this position, it is seated in a second cradle 62 mounted on the frame and held in place using the wedge pin 60.

In this condition of the windrower, with the two ground support wheels on the trailing side of the frame, the leading side is unsupported. The apparatus thus includes a third wheel 64 that is mounted on a pivot arm 66 that pivots between a raised, working position illustrated in FIGS. 1 and 3 and a lowered transport position illustrated in FIG. 2, in which the third wheel 64 is in contact with the ground and supports the leading end of the frame. The arm 66 is pivoted by a hydraulic cylinder 70 extending between the frame and the arm 66. In the working position, the wheel 64 is parallel to the working positions of the two wheels 32. As shown in FIG. 2, this allows the implement to be towed endwise behind a tractor.

While one embodiment of the present invention has been described in the foregoing, it is to be understood that the invention is capable of embodiment in other forms and in association with different kinds of implements. The invention is therefore to be considered limited solely by the scope of the appended claims.

What is claimed is:

1. An agricultural implement having a working travel direction and a transport travel direction transverse to the working travel direction, said implement comprising:

a frame including a leading side and a trailing side each extending laterally between respective ends of the frame in the working travel direction, the frame including a laterally extending beam mounted on the trailing side of the frame;

first and second laterally spaced apart ground wheels, each mounted on the beam at the trailing side of the frame for rotation about a respective upright axis between a working position oriented in the working direction of travel and a transport position oriented in the transport travel direction;

first and second steering arms, each mounted on a respective one of the first and second ground wheels and arranged to be rotated with the ground wheel about the respective upright axis between the working and transport positions;

a hitch pole mounted on the frame for pivotal movement between a laterally extending transport position and a working position transverse to the transport position;

a steering linkage comprising first and second drag links, each pivotally coupled at a first end to the hitch pole and pivotally mounted at a second end on a respective one of the first and second steering arms in both the working and transport positions for connecting the hitch pole to the ground wheels for moving the ground wheels between their transport and working positions together with movement of the hitch pole between the transport and working positions respectively;

a latching mechanism arranged to secure the hitch pole in fixed relation to the frame in both the transport and working positions of the hitch pole, the hitch pole being pivotal between the transport and working positions when the latching mechanism is released;

a third wheel mounted on the leading side of the frame and being movable between a transport position substantially parallel to the first and second ground wheels in their transport positions and a working position spaced above the transport position; and a third wheel lifting device arranged to lift the third wheel from the transport position to the working position.

2. An implement according to claim 1 wherein the hitch pole is pivotally mounted on the beam.

3. An implement according to claim 1 wherein the third wheel lifting device comprises a hydraulic cylinder.

4. An implement according to claim 3 wherein the hitch pole is pivotally mounted on the beam.

5. A rock windrower having a working travel direction and a transport travel direction transverse to the working travel direction, said rock windrower comprising:

a frame having a leading side and a trailing side, each extending laterally between respective ends of the frame in the working travel direction, the frame including a laterally extending beam mounted on the trailing side of the frame;

a windrower element supported on the frame and being arranged to engage the ground when the frame is advanced in the working travel direction;

first and second laterally spaced apart ground wheels, each mounted on the beam at the trailing side of the frame for rotation about a respective upright axis between a working position oriented in the working direction of travel and a transport position oriented in the transport travel direction;

first and second steering arms, each mounted on a respective one of the first and second ground wheels and arranged to be rotated with the ground wheel about the respective upright axis between the working and transport positions;

a hitch pole pivotally mounted on the beam at the trailing side of the frame for movement between a laterally extending transport position and a working position transverse to the transport position in which the hitch pole extends over the windrower element on the frame substantially in the working direction of the frame; and a steering linkage comprising first and second drag links, each pivotally coupled at a first end to the hitch pole and pivotally mounted at a second end on a respective one of the first and second steering arms in both the working and transport positions for connecting the hitch pole to the ground wheels for moving the ground wheels between their transport and working positions together with movement of the hitch pole between the transport and working positions respectively.

6. A rock windrower according to claim 5 including a third wheel mounted on a leading side of the frame for movement between a transport position substantially parallel to the first and second ground wheels in their transport positions, for supporting the leading side of the frame on the ground, and a working position spaced above the transport position.

7. A rock windrower according to claim 6 including a third wheel lifting device arranged to lift the third wheel from the transport position to the working position.

8. A rock windrower according to claim 7 wherein the hitch pole is pivotally mounted on the beam.

9. An agricultural implement arranged to be towed by a towing vehicle having a power take off, in both a working travel direction and a transport travel direction transverse to the working travel direction, said implement comprising:

a frame having a leading side and a trailing side, each extending laterally between respective ends of the frame in the working travel direction;

first and second laterally spaced apart ground wheels, each mounted on the frame for rotation about a respective upright axis between a working position oriented in the working direction of travel and a transport position oriented in the transport travel direction;

first and second steering arms, each mounted on a respective one of the first and second ground wheels and arranged to be rotated with the ground wheel about the respective upright axis between the working and transport positions;

a hitch pole pivotally mounted on the frame for movement between a laterally extending transport position and a working position transverse to the transport position;

a steering linkage comprising first and second drag links, each pivotally coupled at a first end to the hitch pole and pivotally mounted at a second end on a respective one of the first and second steering arms in both the working and transport positions for connecting the hitch pole to the ground wheels for moving the ground wheels between their transport and working positions together with movement of the hitch pole between the transport and working positions respectively;

a driven working element extending laterally across the frame in the working travel direction, the driven working element being supported for movement in relation to the frame;

a drive shaft supported on frame and being coupled to the working element for driving the movement of the working element in relation to the frame;

a power take off shaft supported on the hitch pole for movement with the hitch pole between the transport and working positions of the hitch pole, the shaft being arranged to be coupled to the power take off of the towing vehicle;

a gear box mounted on the hitch pole and being coupled to the power take off shaft, the gear box being arranged to be selectively coupled to the drive shaft in the working position of the hitch pole for driving the working element supported on the frame using the power take off of the towing vehicle.

10. An implement according to claim 9 wherein the frame includes a laterally extending beam mounted at a trailing side of the frame, said first and second ground wheels being mounted on the beam.

11. An implement according to claim 10 wherein the hitch pole is pivotally mounted on the beam.

12. An implement according to claim 9 wherein the implement is a rock windrower.

\* \* \* \* \*